(12) United States Patent
Gans et al.

(10) Patent No.: US 9,288,449 B2
(45) Date of Patent: Mar. 15, 2016

(54) SYSTEMS AND METHODS FOR MAINTAINING MULTIPLE OBJECTS WITHIN A CAMERA FIELD-OF-VIEW

(75) Inventors: Nicholas R. Gans, Gainesville, FL (US); Warren Dixon, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 582 days.

(21) Appl. No.: 13/057,073

(22) PCT Filed: Aug. 5, 2009

(86) PCT No.: PCT/US2009/052803
§ 371 (c)(1),
(2), (4) Date: Feb. 1, 2011

(87) PCT Pub. No.: WO2010/077389
PCT Pub. Date: Jul. 8, 2010

(65) Prior Publication Data
US 2011/0128387 A1  Jun. 2, 2011

Related U.S. Application Data

(60) Provisional application No. 61/086,290, filed on Aug. 5, 2008.

(51) Int. Cl.
*H04N 5/225* (2006.01)
*H04N 7/18* (2006.01)

(52) U.S. Cl.
CPC ..................... *H04N 7/181* (2013.01)

(58) Field of Classification Search
CPC .......... H04N 7/181; H04N 7/127; H04N 7/95
USPC ................................................ 348/140–169
See application file for complete search history.

(56) References Cited

U.S. PATENT DOCUMENTS 4,924,507 A   5/1990  Chao et al.
6,320,978 B1 * 11/2001 Szeliski et al. ................ 382/154
(Continued)

FOREIGN PATENT DOCUMENTS

TW       247229 B    1/2006
WO     0073995 A2   12/2000
WO   2007096002 A1   8/2007

OTHER PUBLICATIONS

International Search Report and Written Opinion dated Jul. 14, 2010.
Bennett, et al., "Enhanced Tracking and Recognition of Moving Objects by Reasoning About Spatio-Temporal Continuity," Image and Vision Computing, vol. 26, Issue 1, Jan. 1, 2008, pp. 67-81.

(Continued)

*Primary Examiner* — Dave Czekaj
*Assistant Examiner* — Md Haque
(74) *Attorney, Agent, or Firm* — Thomas | Horstemeyer, LLP; Christopher B. Linder; Randy R. Schoen

(57) ABSTRACT

In one embodiment, a system and method for maintaining objects within a camera field of view include identifying constraints to be enforced, each constraint relating to an attribute of the viewed objects, identifying a priority rank for the constraints such that more important constraints have a higher priority that less important constraints, and determining the set of solutions that satisfy the constraints relative to the order of their priority rank such that solutions that satisfy lower ranking constraints are only considered viable if they also satisfy any higher ranking constraints, each solution providing an indication as to how to control the camera to maintain the objects within the camera field of view.

28 Claims, 7 Drawing Sheets

(56) References Cited

U.S. PATENT DOCUMENTS

| | | | |
|---|---|---|---|
| 6,437,819 B1 | 8/2002 | Loveland | |
| 6,741,250 B1* | 5/2004 | Furlan et al. | 345/427 |
| 6,972,787 B1* | 12/2005 | Allen et al. | 348/162 |
| 7,030,911 B1* | 4/2006 | Kubo | 348/221.1 |
| 7,034,927 B1* | 4/2006 | Allen et al. | 356/71 |
| 7,272,306 B2 | 9/2007 | Zhang et al. | |
| 7,277,599 B2* | 10/2007 | Eian et al. | 382/285 |
| 7,319,479 B1 | 1/2008 | Crabtree et al. | |
| 7,385,626 B2* | 6/2008 | Aggarwal et al. | 348/143 |
| 2001/0008561 A1 | 7/2001 | Paul et al. | |
| 2002/0030741 A1* | 3/2002 | Broemmelsiek | 348/169 |
| 2004/0017929 A1 | 1/2004 | Bramblet et al. | |
| 2004/0155968 A1* | 8/2004 | Cheatle et al. | 348/207.99 |
| 2005/0007479 A1 | 1/2005 | Ahiska | |
| 2005/0008355 A1* | 1/2005 | Sato et al. | 396/54 |
| 2005/0027435 A1 | 2/2005 | Scheppmann | |
| 2006/0103754 A1* | 5/2006 | Wenstrand et al. | 348/349 |
| 2006/0120606 A1 | 6/2006 | Furuhashi et al. | |
| 2007/0160135 A1* | 7/2007 | Ishikawa et al. | 375/240.01 |
| 2007/0253616 A1* | 11/2007 | Suto | 382/151 |
| 2007/0291104 A1 | 12/2007 | Petersen et al. | |
| 2008/0069405 A1* | 3/2008 | Endo et al. | 382/106 |
| 2008/0129825 A1* | 6/2008 | DeAngelis et al. | 348/169 |

OTHER PUBLICATIONS

Pavon, et al., "Development of Intelligent Multisensor Surveillance Systems with Agents," Robotics and Autonomous Systems, vol. 55, Issue 12, Dec. 31, 2007, pp. 892-903.

Aguilar-Ponce, et al., "A Network of Sensor-Based Framework for Automated Visual Surveillance," Journal of Network and Computer Applications, vol. 30, Issue 3, Aug. 2007, pp. 1244-1271.

Fuentes, et al., "People Tracking in Surveillance Applications," Image and Vision Computing, vol. 24, Issue 11, Nov. 1, 2006, pp. 1165-1171.

Lei, et al., "Real-Time Outdoor Video Surveillance with Robust Foreground Extraction and Object Tracking Via Multi-State Transition Management," Pattern Recognition Letters, vol. 27, Issue 15, Nov. 2006, pp. 1816-1825.

Amer, et al., "Rule-Based Real-Time Detection of Context-Independent Events in Video Shots," Real-Time Imaging, vol. 11, Issue 3, Jun. 2005, pp. 244-256.

Ukita, et al., "Real-Time Cooperative Multi-Target Tracking by Communicating Active Vision Agents," Computer Vision and Image Understanding, vol. 97, Issue 2, Feb. 2005, pp. 137-179.

KaewTrakulPong, et al., "A Real Time Adaptive Visual Surveillance System for Tracking Low-Resolution Colour Targets in Dynamically Changing Scenes," Image and Vision Computing, vol. 21, Issue 10, Sep. 2003, pp. 913-929.

* cited by examiner

SYSTEMS AND METHODS FOR MAINTAINING MULTIPLE OBJECTS WITHIN A CAMERA FIELD-OF-VIEW

CROSS REFERENCE TO RELATED APPLICATION

This application is the 35 U.S.C. §371 national stage application of PCT Application No. PCT/US2009/052803, entitled "SYSTEMS AND METHODS FOR MAINTAINING MULTIPLE OBJECTS WITHIN A CAMERA FIELD-OF-VIEW" and filed on Aug. 5, 2009, which claims priority to and the benefit of U.S. provisional application entitled "Visual Servo Controller Configured to Keep Multiple Objects in a Camera Field-of-View" and having serial number 61/086,290, filed on Aug. 5, 2008, which is entirely incorporated herein by reference.

NOTICE OF GOVERNMENT-SPONSORED RESEARCH

The disclosed inventions were made with U.S. Government support under Grant No.: DE-FG04-86NE37967 awarded by the U.S. Department of Energy. The U.S. Government has rights in the claimed inventions.

BACKGROUND

The use of image data in feedback control of a mechanical system, commonly referred to a visual servo control, is an established and diverse field. There are many approaches, including image-based visual servoing (IBVS), position-based visual servoing, partitioned methods, and switching methods. Most visual servo control methods have a common goal, such as a goal image, that is used to regulate a camera, robot manipulator, or unmanned vehicle to a desired camera pose or trajectory. For example, an image of a scene may be captured (the goal image) and later images may be captured and compared with the original image after the camera has been moved to identify when the camera has returned to its original position (the goal pose).

In many vision-based control tasks, there is no goal image from which to work, as well as no goal pose or trajectory. For instance, if the desired task is to maintain multiple moving objects in the camera filed-of-view, no goal image exits because the motion and position of the objects are not known ahead of time. In such situations, visual servo control methods may be ineffective.

BRIEF DESCRIPTION OF THE DRAWINGS

The accompanying drawings, which are incorporated in and form a part of the specification, illustrate embodiments of the presently disclosed inventions. The drawings are not necessarily drawn to scale.

DETAILED DESCRIPTION

Introduction

As described above, existing visual servo control methods may be ineffective at performing various vision-based control tasks, including maintaining multiple moving objects within a camera field of view (FOV). Described herein are systems and methods with which such objects can be effectively maintained within the camera FOV. Unlike conventional systems and methods, the disclosed systems and methods use no goal images. Instead, a set of underdetermined task functions are used to regulate various imposed constraints that control one or more of the camera's, settings, pose, position, and velocity so as to maintain the target objects within the camera FOV. The imposed constraints can be selected to suit the particular application. Example constraints include the average position or mean of the objects and the variance of each object from the mean. Of course, other constraints can be used depending upon the application or the degree of control that is to be exercised.

In some embodiments, a desired task function velocity is mapped to a time-varying feature velocity through corresponding underdetermined task function Jacobians featuring multidimensional null spaces. A multidimensional null space permits cascading of several task functions, which generates a feature velocity. These task function Jacobians are suitable for task-priority kinematic control. In some cases, the time-varying feature velocity is mapped to camera motions using IBVS methods.

The above-described control approach can be used for various purposes. One possible scenario is surveillance of a crowd in which a camera views the crowd from above and tracks individuals within the camera's FOV. Another scenario involves tracking moving vehicles.

In the discussions that follow, a control approach is first described that uses various task functions that can be used to generate the desired feature velocity. An application of the approach and simulations of tasks are also described below to demonstrate the performance of the control approach.

Discussion of the Control Approach

1. Camera Model

Figure 1:
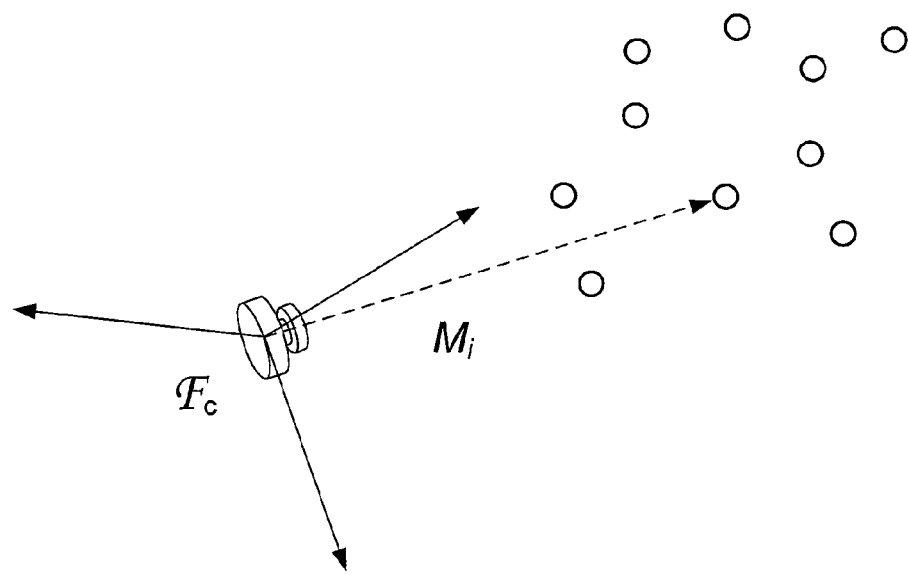
FIG. 1 is a diagram that illustrates an example camera model.

Consider a camera with coordinate frame $F_c(t)$ as shown in FIG. 1. The camera views a collection of k feature points in front of the camera. These points have coordinates $M_i(t) \in \mathbb{R}^3$ defined as $$M_i = [X_i, Y_i, Z_i]^T, \forall i \in \{1 \ldots k\}$$

in the camera frame. An image of the points is captured, resulting in a projection to a set of points in the image frame. These image points are given by the normalized coordinates $$\bar{m}_i = \left[\frac{X_i}{Z_i}, \frac{Y_i}{Z_i}, 1\right]^T = [x_i, y_i, 1]^T, \quad \forall i \in \{1 \ldots k\}.$$

Because the last element of the three-dimensional normalized coordinates is superfluous, it is not considered in the sequel. Define the coordinates $m_i(t) \in \mathbb{R}^2$ as $$m_i = [x_i, y_i]^T \quad (1)$$

with velocity $\dot{m}_i(t) \in \mathbb{R}^2$ in the image plane given by $$\dot{m}_i = [\dot{x}_i, \dot{y}_i]^T. \quad (2)$$

Given the collection of k feature points, along with their coordinates and velocity vectors, a state position vector $m(t)$ and state velocity vector $\dot{m}(t)$ are defined as $$m = [m_1^T, m_2^T, \ldots, m_k^T]^T$$

$$\dot{m} = [\dot{m}_1^T, \dot{m}_2^{aT}, \ldots, \dot{m}_k^T]^T.$$

The features points velocity is given as a function of the camera velocity $v_c(t) = [v_x, v_y, v_z, \omega_x, \omega_y, \omega_z]^T \in \mathbb{R}^6$ by the relationship $$\dot{m} = L v_c, \quad (3)$$

where $L(t) \in \mathbb{R}^{2k \times 6}$ is the image Jacobian, $v_x(t)$, $v_y(t)$, and $v_z(t)$ describe the linear velocity of the camera, and $\omega_x(t)$, $\omega_y(t)$, and $\omega_z(t)$ are the angular velocity of the camera for a six degree of freedom system. The image Jacobian for the feature points, $L(t) \in \mathbb{R}^{2k \times 6}$, is given by concatenating a set of k submatrices $L_i(t) \in \mathbb{R}^{2 \times 6}$, with $L_i(t)$ given as $$L_i = \begin{bmatrix} \frac{1}{Z_i} & 0 & \frac{x_i}{Z_i} & -x_i y_i & 1 + x_i & -y_i \\ 0 & \frac{1}{Z_i} & \frac{y_i}{Z_i} & -1 - y_i^2 & x_i y_i & x_i \end{bmatrix}. \quad (4)$$

In the case that the feature points are not static in an inertial frame world frame (e.g., the feature points are tracked on moving objects), the time derivative of the feature points is given by $$\dot{m} = L v_c + \epsilon, \quad (5)$$

where $\epsilon(t)$ is generally an unknown function. It is assumed that $\epsilon(t)$ is bounded.

2. Task Function-Based Kinematic Control

The control objective is to keep a set of feature points within the camera FOV without a specific camera pose. To achieve this, a set of task functions are defined using image feature coordinates. By regulating the task functions, features can be kept in the FOV. However, the task functions may compete in the sense that reducing the error of one task function may increase the error of another. To avoid competition between task functions, task-priority kinematic control is used. This section provides a foundation for the task functions, how they are combined in task-priority kinematic control, and how the resulting signal is mapped to camera velocity commands. Three specific task functions and final control law are detailed in the section entitled Control Development.

Let $\phi(t) \in \mathbb{R}^n$ denote a task function of the feature point coordinates $m^i(t)$ as $$\Phi = f(m_1, \ldots, m_k)$$

with derivative $$\dot{\phi} = \sum_{i=1}^{k} \frac{\partial f}{\partial m_i} \dot{m}_i = J(m) \dot{m}, \quad (6)$$

where $J(m) \in \mathbb{R}^{n \times 2k}$ is the task Jacobian matrix. In the section entitled Control Development that follows, the task functions are of dimension $n \leq 2$.

The task is to drive the feature points along a desired velocity $\dot{m}_\Phi(t)$ such that $\Phi(t)$ follows a desired trajectory $\Phi_d(t)$. Given the underdetermined structure of the Jacobian matrix, there are infinite solutions to this problem. The typical solution based on the minimum-norm approach is given as $$\dot{m}_\varphi = J^\dagger [\dot{\varphi}_d - \lambda(\varphi - \varphi_d)] \quad (7)$$
$$= J^T (JJ^T)^{-1} [\dot{\varphi}_d - \lambda(\varphi - \varphi_d)],$$

where $\lambda$ is a positive scalar gain constant and $J^\dagger(m) \in \mathbb{R}^{2k \times n}$ denotes the minimum-norm general inverse of $J(m)$. The camera velocity $v_c(t)$ is designed as $$v_c = L^+ \dot{m}_\Phi = (L^T L)^{-1} L^T \dot{m}_{101}, \quad (8)$$

where $L^+(t) \in \mathbb{R}^{6 \times 2k}$ denotes the least squares general inverse used for $L(t)$. Note that since $J(m)$ is underdetermined (i.e. more columns than rows), and $L(t)$ is overdetermined (i.e. more rows than columns), the general inverses have different solutions and care is taken to denote them differently. The symbol † denotes the minimum norm general inverse used for $J(t)$ and + denotes the least-squares general inverse used for $L(t)$.

A set of task functions can be combined in various ways. The simplest approach is to add the desired feature velocity from each task function to create the total desired feature point velocity. For example, consider two tasks $\Phi_a(t)$ and $\Phi_b(t)$ with resulting desired feature velocities $\dot{m}_a(t)$ and $\dot{m}_b(t)$. The camera velocity is then given as $$v_c = L^+ (\dot{m}_a + \dot{m}\phi b). \quad (9)$$

Since the task function velocities are undetermined, an optional method is to choose one task as primary, and project the other tasks into the null space of the primary task derivative as $$v_c = L^+ (\dot{m}_a + (I - J_a^\dagger J_a) \dot{m}_b) \quad (10)$$
$$= L^+ \left( J_a^\dagger \dot{\varphi}_a + (I - J_a^\dagger J_a) J_b^\dagger \dot{\varphi}_b \right),$$

where $J_a(m_a)$ and $J_b(m_b)$ are the task Jacobian matrices with respect to $\Phi_a(t)$ and $\Phi_b(t)$, respectively.

The approach in Equation 10 prevents the systems from competing and negating each other, as the primary task is always accomplished. Lower priority control tasks are achieved to the extent that they do not interfere with higher priority tasks. Tertiary, quaternary, etc. tasks can be prioritized by repeating this process and projecting each subsequent task into the null space of the preceding task Jacobians.

3. Control Development

In this section, three task functions are presented as part of a task-priority kinematic controller. The control objective of this invention is to keep a set of feature points corresponding to multiple tracked, moving targets within the camera FOV. Two task functions are designed to regulate the mean and variance of feature point coordinates. Regulating the mean at the camera center keeps the feature points centered in the FOV. Regulating the variance restricts the distance between the feature points and keeps features away from the edge of the FOV. The third task function maximizes motion perceptibility, which ensures desired image velocities can be met. These three task functions are cascaded through null space projection and mapped to camera velocity, as described the section entitled Task Function-Based Kinematic Control.

a. Task Function for Mean of Image Points

Controlling the mean of feature point coordinates helps to ensure the feature points are centered around a position in the image plane. Let $\phi_m(t) \in \mathbb{R}^2$ denote a task function defined as the sample mean $$\phi_m = \frac{1}{k}\sum_{i=1}^{k} m_i = \bar{m}. \tag{11}$$

The open-loop derivative of $\Phi_m(t)$ is given by $$\dot{\phi}_m = \frac{1}{k}\sum_{i=1}^{k} \frac{\partial \phi_m}{\partial m_i} \dot{m}_i = J_m \dot{m} \tag{12}$$

$$= J_m(Lv_c + \varepsilon), \tag{13}$$

where $J_m(t) \in \mathbb{R}^{2 \times 2k}$ is a task function Jacobian, and $L$, $v_c$, and $\varepsilon$ were given in Equation 5. The Jacobian $J_m(t)$ is defined as $$J_m = \frac{1}{k}[I_2, \ldots, I_2],$$

where $I_2$ is the 2×2 identity matrix and is repeated k times.

In the general case, the objective is to regulate the mean to a desired trajectory. This helps ensure the features are centered around a specific, time varying point in the image. A desired task function trajectory $\Phi_{md}(t)$ is defined with a known, smooth derivative $\dot{\Phi}_{md}(t)$. To regulate the mean to the desired trajectory, a feature point velocity, denoted by $\dot{m}_m(t) \in \mathbb{R}^{2k}$, can be designed as $$\dot{m}_m = J_m^\dagger[\dot{\phi}_{md} - \lambda_m(\phi_m - \phi_{md})], \tag{14}$$

where $\lambda_m$ is a positive scalar gain constant, and the subscript denotes that $\dot{m}_m(t)$ is designed with respect to the task function for mean. Combining Equations 12 and 14 gives the closed-loop derivative of $\Phi_m(t)$ as $$\dot{\Phi}_m = -\lambda_m(\Phi_m - \Phi_{md}) + \dot{\Phi}_{md} + \epsilon_m, \tag{15}$$

where $\epsilon_m(t) = J_m^\dagger(t)\epsilon(t) \in \mathbb{R}^2$ is an unknown function of the velocity of the feature points, and can be modeled as an input disturbance. Assuming that $\epsilon_m(t)$ is bounded, and $\lambda_m$ is significantly large, it can be shown that $\Phi_m(t)$ goes to a neighborhood of $\Phi_{md}(t)$ exponentially fast. If the desired trajectory $\Phi_{md}(t)$ is simplified to a constant set value $\Phi_{md}$, Equations 14 and 15 can be simplified as $$\dot{m}_m = -\lambda_m J_m^\dagger(\Phi_m - \Phi_{md}) \tag{16}$$

and $$\dot{\Phi}_m = -\lambda_m(\Phi_m - \Phi_{md}) + \epsilon_m.$$

The controller can be made more robust to the disturbance $\epsilon_m$ by adding an error integral term and an error derivative term to Equation 16. This proportional-integral-derivative (PID) controller is given by $$\dot{m}_m = -J_m^\dagger\left(\lambda_m \phi_{me} + \lambda_{mi}\int_0^t \phi_{me}\, dt + \lambda_{md}\frac{d}{dt}\phi_{me}\right), \tag{17}$$

where $\Phi_{me}(t) = \Phi_m(t) - \Phi_{md}$ and $\lambda_{mi}, \lambda_{md} \in \mathbb{R}$ are constant gains.

For more than three feature points, the desired $\dot{m}_m(t)$ may not be achievable. Substituting $\dot{m}_m(t)$ in Equation 3 gives $$v_c = L^+ \dot{m}_m.$$

If k>3, $L^+(t)$ is underdetermined, meaning there are six degrees of freedom available in $v_c(t)$ to control more than six terms in $\dot{m}_m(t)$. This problem is partially addressed by maximizing perceptibility in the section entitled Task Function for Perceptibility of Image Points.

b. Task Function for Variance of Image Points

Regulating the variance of the feature point coordinates regulates the spread of the feature points in the image. That is, regulating the variance controls how far the feature points drift from the mean value. Define a task function $\Phi_v(t) \in \mathbb{R}^2$ as the sample variance $$\phi_v = \frac{1}{k}\sum_{i=1}^{k} \begin{bmatrix} (x_i - \bar{x})^2 \\ (y_i - \bar{y})^2 \end{bmatrix},$$

where $\bar{x}(t)$ and $\bar{y}(t)$ are the mean of all the x and y components of $m_i(t)$, $i \in \{1 \ldots k\}$, $E\{1 \ldots k\}$, respectively.

To find the variance task function Jacobian, consider the partial derivative of $\Phi_v(t)$ with respect to $x_1(t)$ $$\frac{\partial \dot{\phi}_v}{\partial x_1} = \frac{\partial}{\partial x_1}\left[\frac{1}{k}\sum_{i=1}^{k}(x_i - \bar{x})^2\right] \tag{18}$$

$$= \frac{2}{k}\left[\sum_{i=1}^{k}(x_i - \bar{x})\left(\frac{\partial x_i}{\partial x_1} - \frac{1}{k}\sum_{j=1}^{k}\frac{\partial x_j}{\partial x_1}\right)\right]$$

$$= \frac{2}{k}\left[(x_1 - \bar{x}) - \frac{1}{k}\sum_{i=1}^{k}(x_i - \bar{x})\right]$$

$$= \frac{2}{k}[(x_1 - \bar{x}) - \bar{x} + \bar{x}]$$

$$= \frac{2}{k}[(x_1 - \bar{x})].$$

Repeating the above simplifications for all $x_i(t)$, $y_i(t)$, $i \in \{1 \ldots k\}$, gives the open-loop derivative of $\Phi_v(t)$ as $$\dot{\phi}_v = J_v \dot{m} \tag{19}$$

$$= J_v(Lv_c + \varepsilon) \tag{20}$$

where and $L(t)$, $v_c(t)$, and $\epsilon(t)$ were given in Equation 5, and $J_v(t) \in \mathbb{R}^{2 \times 2k}$ is a task function Jacobian given by $$J_v = \frac{2}{k}\begin{bmatrix} x_1 - \bar{x} & 0 & x_2 - \bar{x} & 0 & \cdots & x_k - \bar{x} & 0 \\ 0 & y_1 - \bar{y} & 0 & y_2 - \bar{y} & \cdots & 0 & y_k - \bar{y} \end{bmatrix}.$$

To regulate the variance to a desired trajectory $\Phi_{vd}(t)$ (with a known, smooth derivative $\dot{\Phi}_{vd}(t)$) the feature point velocity $\dot{m}_v(t) \in \mathbb{R}^{2k}$ can be designed by following the method in the section entitled Task Function for Mean of Image Points to give $$\dot{m}_v = J_v^\dagger [\dot{\Phi}_{vd} - \lambda_v(\Phi_v - \Phi_{vd})], \quad (21)$$

where $\lambda_v$ is a positive scalar gain constant. Combining Equations 19 and 21 gives the closed-loop derivative of $\phi_v(t)$ as $$\dot{\Phi}_v = -\lambda_v(\Phi_v - \Phi_{vd}) + \dot{\Phi}_{vd} + \epsilon_v,$$

where $\epsilon_v(t) \in \mathbb{R}^2$ is an unknown disturbance caused by the velocity of the feature points. Under the assumption that that $\epsilon_v(t)$ is bounded, if $\lambda_v$ is significantly large, it can be shown that $\Phi_v(t)$ goes to a neighborhood of $\Phi_{vd}(t)$ exponentially fast.

If the desired trajectory $\Phi_{vd}(t)$ is simplified to a constant set value $\Phi_{vd}$, Equations 14 and 15 can be simplified as $$\dot{m}_v = -\lambda_m J_m^\dagger (\Phi_m - \Phi_{md}) \quad (22)$$

and $$\dot{\Phi}_v = -\lambda_v(\Phi_v - \Phi_{vd}) + \epsilon_v.$$

To increase robustness to the input disturbance $\epsilon_v(t)$, integral and derivative terms can be added to Equation 16 to give the PID feedback control $$\dot{m}_v = -J_v^\dagger \left( \lambda_v \varphi_{ve} + \lambda_{vi} \int_0^t \varphi_v \, dt + \lambda_{vd} \frac{d}{dt} \varphi_{ve} \right), \quad (23)$$

where $\Phi_{ve}(t) = \Phi_v(t) - \Phi_{vd}$ and $\lambda_{vi}, \lambda_{vd} \in \mathbb{R}^+$ are constant gains.

Task Function for Perceptibility of Image Points

Perceptibility gives a measure of how well a camera can perceive the motion of objects in the FOV. Roughly speaking, if perceptibility is high, small object or camera velocities results in notable feature velocities in the image plane (e.g., high optical flow). This is especially important if there are more than three feature points, as the available feature point velocities are constrained due to an overdetermined image Jacobian. Maintaining a high perceptibility helps to ensure a larger span of available feature point velocity vectors.

Perceptibility is a scalar function of the image Jacobian $L(t)$, defined as $$w_v = \sqrt{\det(L^T L)} = \prod_{i=1}^{6} \sigma_i,$$

where $\sigma_i(t) \in \mathbb{R}^+$ are the singular values of $L(t)$. Maximizing $w_v(t)$ is accomplished by maximizing each $\sigma_i(t)$. The matrix $L^T(t)L(t) \in \mathbb{R}^{6 \times 6}$ is positive definite and symmetric, so the eigenvalues of $L^T(t)L(t)$ are equal to $\sigma_i^2(t)$. The trace of a matrix is equal to the sum of its eigenvalues. Therefore, the trace of $L^T(t)L(t)$ is related to the singular values by $$Tr(L^T L) = \sum_{i=1}^{6} \sigma_i^2.$$

Increasing the trace of $L^T(t)L(t)$ also increases the perceptibility.

The trace of $L^T(t)L(t)$ is given by $$Tr(L^T L) = \sum_{i=1}^{k} \frac{2}{Z_i^2} + \frac{x_i^2}{Z_i^2} + \frac{y_i^2}{Z_i^2} + x_i^2 y_i^2 + (y_i^2 + 1)^2 + \quad (24)$$

$$x_i^2 y_i^2 + (x_i^2 + 1)^2 + x_i^2 + y_i^2$$

$$= \sum_{i=1}^{k} \frac{2}{Z_i^2} + \left(1 + \frac{1}{Z_i^2}\right)(x_i^2 + y_i^2) + 2x_i^2 y_i^2 +$$

$$(y_i^2 + 1)^2 + (x_i^2 + 1)^2.$$

For purposes of this disclosure, the task functions are functions of image feature coordinates $m_i(t)$ only. For this reason, the task function for perceptibility contains the terms of $Tr(L^T L)$ that do not depend on depth $Z_i(t)$. This is acceptable as the depth terms in Equation 24 are all quadratics. Increasing the terms other than $Z_i(t)$ serves to increase the trace of $L_T(t)_L(t)$. A task function for perceptibility of the system is defined as $$\varphi_p = \frac{1}{\sum_{i=1}^{k} x_i^2 + y_i^2} \quad (25)$$

Since it is desired to increase $Tr(L^T L)$, regulating $\Phi_p(t)$ to 0 results in increasing the trace.

The open-loop derivative of $\Phi_p(t)$ is given by $$\dot{\varphi}_p = -4\varphi_p^2 \sum_{i=1}^{6} \begin{bmatrix} \frac{3}{2}x_i + x_i y_i^2 + x_i^3 \\ \frac{3}{2}y_i + y_i x_i^2 + y_i^3 \end{bmatrix}^T \begin{bmatrix} \dot{x}_i \\ \dot{y}_i \end{bmatrix} \quad (26)$$

$$= J_p(m)\dot{m} = J_p(m)(Lv_c + \varepsilon)$$

where $L(t)$, $v_c(t)$ and $\epsilon(t)$ were given in (5), and $J_p(m) \in \mathbb{R}^{1 \times 2k}$ is the task function Jacobian for perceptibility.

To regulate $\Phi_p(t)$ to 0, the feature point velocity $\dot{m}_p(t) \in \mathbb{R}^{2k}$ is designed as $$\dot{m}_p = -\lambda_p J_p^\dagger \Phi_p \quad (27)$$

where $\lambda_p$ is a positive scalar gain constant. Combining Equations 26 and 27 gives the closed-loop derivative of $\Phi_p(t)$ as $$\dot{\Phi}_p = -\lambda_p \Phi_p + \epsilon_p,$$

where $\epsilon_p(t)$ is an unknown disturbance caused by the velocity of feature points. Despite the presence of the disturbance $\epsilon_p(t)$, the use of integral feedback is not recommended for the perceptibility term. This is due to the fact that $\Phi_p(t)$ is unlikely to ever become zero, leading to possible integrator windup and related stability problems.

d. Cascaded Camera Control Law

As stated in the section entitled Task Function-Based Kinematic Control, the control objective of this invention is to design a kinematic camera controller that maintains a set of feature points within the camera FOV. The mean of feature point coordinates is the best variable to measure the center of the feature points. Regulating the mean is chosen as the primary task in order to keep the feature points centered in the FOV. Regulating the variance to a constant is chosen as the second task to restrict the distance between the feature points and the image center. These two tasks are sufficient to keep features in the FOV. High perceptibility allows these two tasks to work more efficiently by ensuring larger available feature velocities at lower camera velocities. For this reason, increasing perceptibility is chosen as the tertiary task.

The designed feature velocities given in Equations 16, 22, 27, or 17, 23, and 27 are used in the null space projection camera velocity Equation 10 to give the overall controller as $$v_c = L^+(\dot{m}_m + (I - J_m^\dagger J_m)[\dot{m}_v + (I - J_v^\dagger J_v)\dot{m}_p]). \quad (28)$$

Application of the Control Approach

As is apparent from the above discussion, the disclosed control approach is a layered approach in which multiple constraints can be enforced according to a predefined priority. An example application of the control approach will now be discussed with reference to the flow diagram of FIGS. 2A and 2B. More particularly, discussed is an example embodiment of a method for maintaining multiple moving objects (targets) within a camera FOV.

Figure 2A:
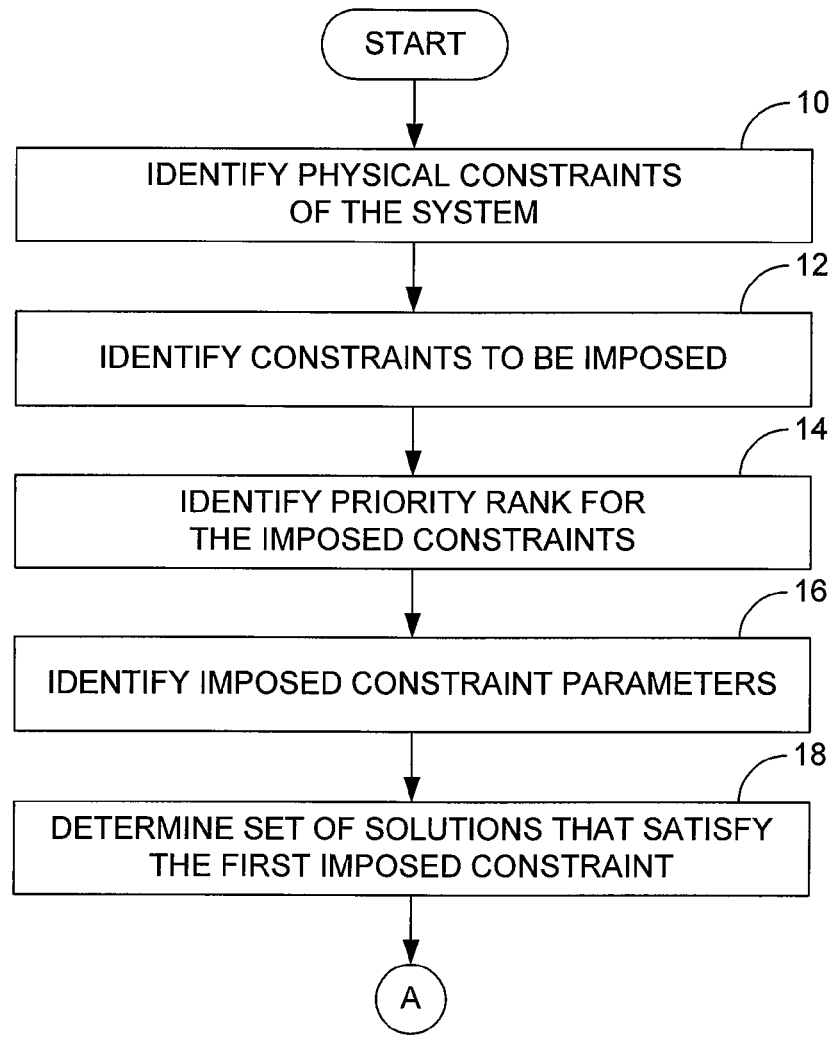
FIGS. 2A and 2B illustrate a flow diagram of an example method for maintaining multiple moving objects within a camera field of view.
Figure 2B:
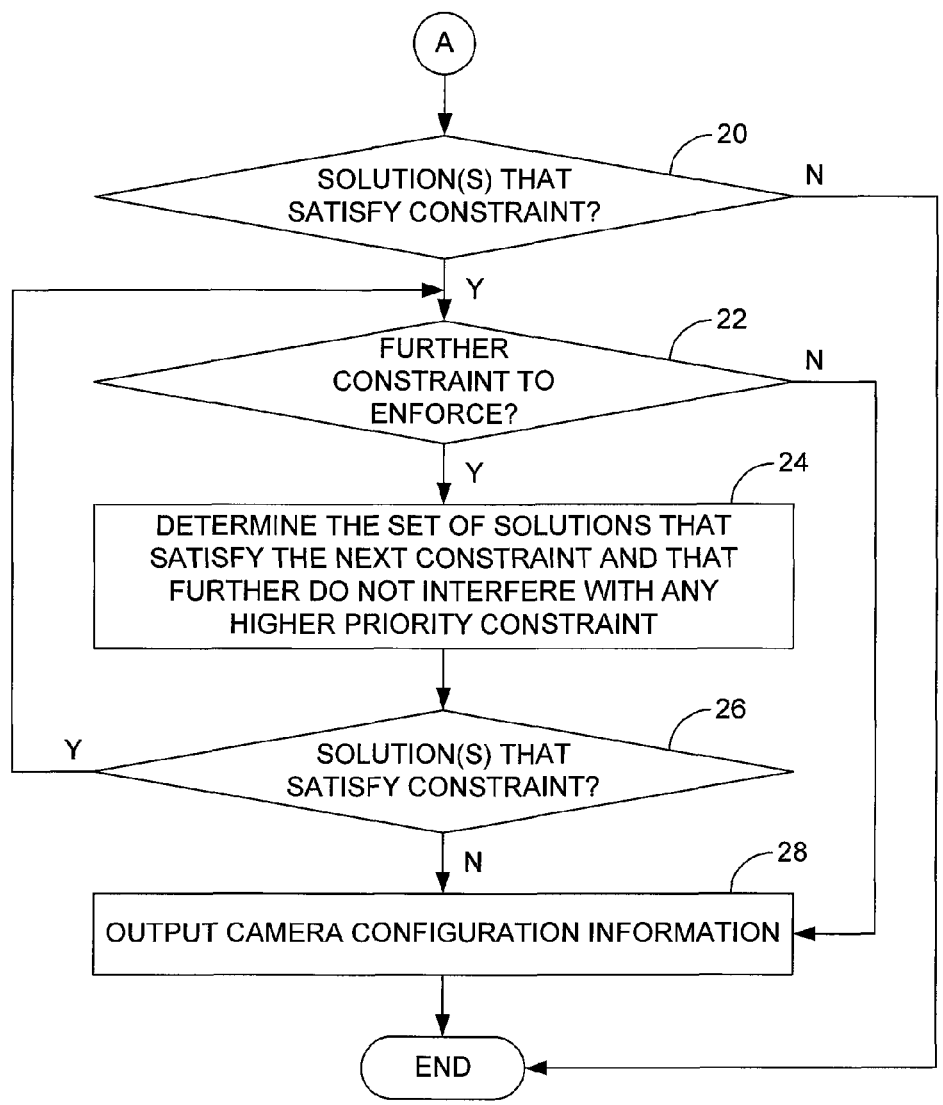

Before control can be exercised to maintain objects within the camera FOV, the physical constraints of the system must be identified, as indicated in block 10 of FIG. 2A. Such physical constraints can include whether the camera is a fixed camera or a camera that can physically translate (e.g., pan and tilt) and, if the latter, the range of motion through which the camera can translate. Other physical constraints include the camera specifications, such as focal length, zoom capacity, focusing speed, zoom speed, and the like. In addition, relevant physical constraints can include whether the camera position can be changed, for instance by a helicopter, plane, or unmanned aerial vehicle (UAV) to which the camera is attached and the motion of which such a craft is capable. All such physical constraints affect whether, and the manner in which, objects can be maintained within the camera FOV.

In addition to identifying the physical constraints, the constraints that are to be imposed and enforced must also be identified, as indicated in block 12. In some embodiments, a user can select the imposed constraints to suit to a particular problem with which the user is faced. Alternatively, a default set of imposed constraints can be automatically implemented. As described above, various constraints can be enforced. One constraint that is particularly useful in maintaining multiple moving objects within a camera FOV is the mean constraint, which is used to control the location of the mean object position within the camera FOV. In most cases, control is exercised such that the object mean is coincident with the center of the camera FOV. Another constraint that is useful in the moving objects scenario is the variance constraint, which can be used to control how far each object can stray from the object mean within the camera image. Together, those two constraints can be used to dictate the center of the camera image and a boundary within which the objects are to be contained, which may be thought of as a radius extending from the object mean.

In some cases, the two constraints identified above will be not enough to achieve a desired task, such as ensuring that tracked objects will remain in the camera FOV. Therefore, other constraints can also be used. One such constraint is the perceptibility constraint, which can be used to control the perceptibility of motion of the observed objects. Other example constraints include the area of a polygon defined by the objects that can be used to constrain the spread of objects within the FOV, constraints on the relative position between the camera and objects that can be used to maintain a desired stand-off distance, the distance of the camera from another object or location (e.g., friendly vehicle or ground station), and approach vectors to the objects.

When multiple constraints are used, there is no guarantee that it will be possible to satisfy or enforce each of them at the same time. Therefore, the priority rank of the constraints is identified, as indicated in block 14. By identifying such priority rank, the most important constraints can be satisfied (if possible) before other less important constraints. For the problem of maintaining multiple moving objects (targets) within a camera FOV, it may make sense to assign the highest priority to the mean constraint, the second highest priority to the variance constraint, and lower priorities to other constraints, if applicable. In some embodiments, the priority rank can be selected by a user. Alternatively, a default ranking can be automatically implemented.

Once the constraints to be enforced have been identified, the parameters for each constraint can be identified, as indicated in block 16. Again, the parameters can be selected by a user or automatically implemented as a default. The parameters used depend upon the underlying constraint. For example, if the constraint is the mean constraint, the parameter can be the location within the camera FOV at which to position the object mean. As mentioned above, the center of the camera FOV is a good candidate for that location when attempting to maintain multiple objects within the FOV. If the constraint is variance constraint, the parameter can be the maximum camera image distance (e.g., in pixels) that any object can move from the object mean (e.g., FOV center).

Once each of the physical constraints, the imposed constraints, the constraint priorities, and the constraint parameters have been identified to or by the system, the system operates to maintain multiple moving objects within the FOV. To do so, the system attempts to enforce each imposed constraint in the order of its priority. In particular, the set of solutions that satisfy the first constraint are determined, the set of solutions that satisfy the second constraint that do not interfere with the first constraint are determined, and so forth until each constraint has been satisfied or a constraint is encountered that cannot be satisfied. As described above in the Discussion of the Control Approach section, this can be accomplished using Equation 28. Blocks 18-28 describe an equivalent process (logical flow) that is performed when solving that equation.

Referring to block 18, the set of solutions, if any, that satisfy the first imposed constraint is determined. As used herein, the term "solutions" relates to camera configurations, which may include one or more of the camera settings, pose, position in three-dimensional space, and velocity. In some embodiments, determining the set of solutions comprises determining the null spaces of the Jacobian matrix associated with the constraint's task function. With reference to decision block 20 of FIG. 2B, if there is no solution to the constraint, the objects cannot all be maintained within the camera FOV and flow for the instant process is terminated. Of course control could be exercised to maintain as many of the objects within the camera FOV as possible. In addition or in alternative, a control routine could be used to recover sight of any lost object. If there are one or more solutions that satisfy the constraint, however, flow proceeds to decision block 22 at which it is determined whether there is another constraint to be satisfied. If not, no other constraints will be satisfied and camera configuration information that identifies a camera configuration that will ensure that the objects are maintained within the camera FOV is output (block 28), for example to an appropriate camera controller. Such configuration information can comprise information as one or more of the camera settings, pose, position, and velocity required to keep all of the objects in the FOV. In some embodiments, the configuration information can comprise a single camera configuration from a group of viable camera configurations. In other embodiments, the configuration information can include every viable camera configuration and the decision as to which to implement can be made by another component entity (e.g., camera controller or camera operator).

Referring again to decision block 22, if there is another imposed constraint to satisfy, flow continues to block 24 at which the set of solutions that satisfy the next constraint and that further do not interfere with any higher priority constraint is determined. In cases in which the solutions are determined by identifying null spaces of Jacobian matrices associated with the constraints, determining the set of solutions for the lower priority constraint comprises identifying the null spaces of the lower priority constraint's Jacobian matrix that lie in the null space of the Jacobian matrix of the higher priority constraint. By doing so, no solution for any constraint will be considered valid unless it is also valid for any preceding higher priority constraint. Referring next to decision block 26, if there is no solution that satisfies the next constraint as well as previous, higher priority constraints, flow proceeds to block 28 at which the previously generated camera configuration information is output. If, however, there is at least one solution that satisfies the next constraint and the preceding constraints, flow returns to decision block 22 at which it is determined whether there is a further imposed constraint to satisfy.

The process described above in relation to blocks 22-26 repeats until either a constraint is encountered that cannot be satisfied while simultaneously satisfying higher-priority constraints or every imposed constraint has been satisfied. In either case, camera configuration information is provided that can be used to control the camera so as to maintain moving objects within the camera FOV.

It is noted that, because the objects within the camera FOV are moving and therefore changing position as a function of time, the process performed in blocks 18-28 is continually performed as long as the objects are tracked so that one or more of the camera settings, pose, and position can be continually adjusted to account for the object movement. By way of example, the system outputs camera configuration information that can be used to adjust the camera at least 30 times a second, which is currently the operating frequency of most standard video cameras.

Simulation Results

Simulations were performed using the proportional controller and PID controller given in Equation 28. Those simulations are described below as Simulations 1 and 2.

1. Simulation 1: Randomly Moving Points

In the first simulation, a camera observed eight independent points moving with random acceleration in three dimensions. This simulation mimicked the case of keeping multiple objects in the FOV, such as and airborne camera watching a dispersing crowd or several moving vehicles. In this situation, the features could come from extracted centers of segments in the image. The camera had a resolution of 512×512. The mean was regulated to $[256, 256]^T$, i.e., the image center. The variance was regulated to $[100^2, 100^2]^T$, giving a standard deviation of 100 pixels. The simulation was executed for 10 seconds at 30 frames per second.

Figure 3:
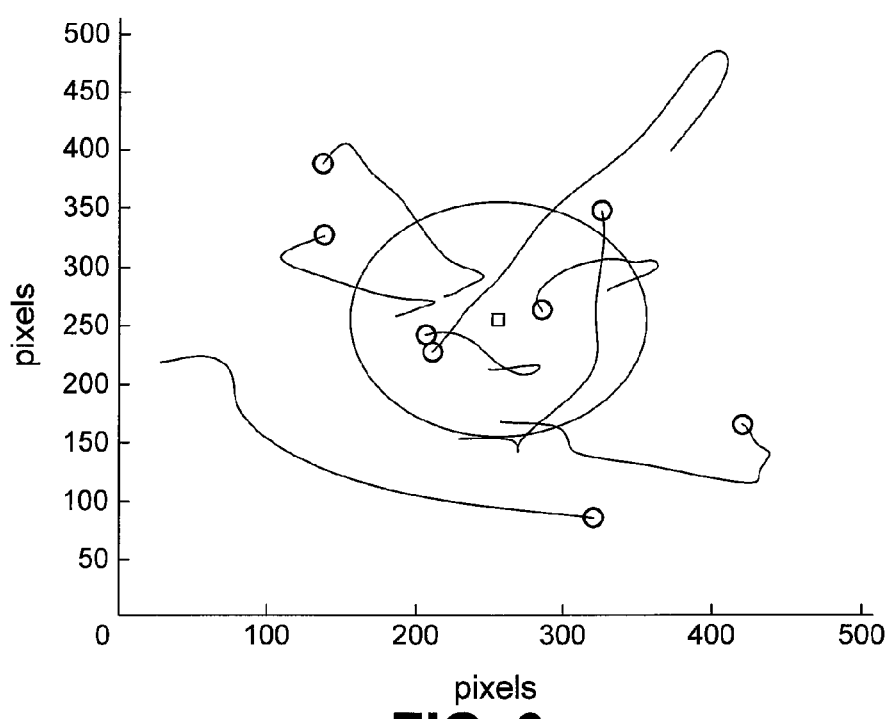
FIG. 3 is a graph that depicts feature point trajectories for tracking randomly moving points with PID control.
Figure 4:
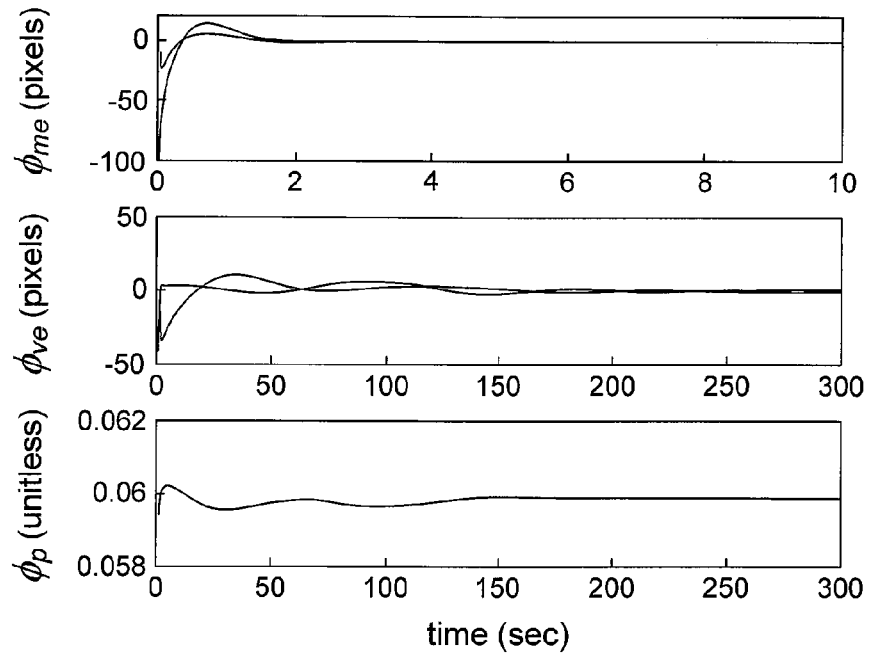
FIG. 4 comprises graphs that depict error in $\Phi_m$, $\Phi_v$, $\Phi_p$ over time for tracking randomly moving points with PID control.
Figure 5:
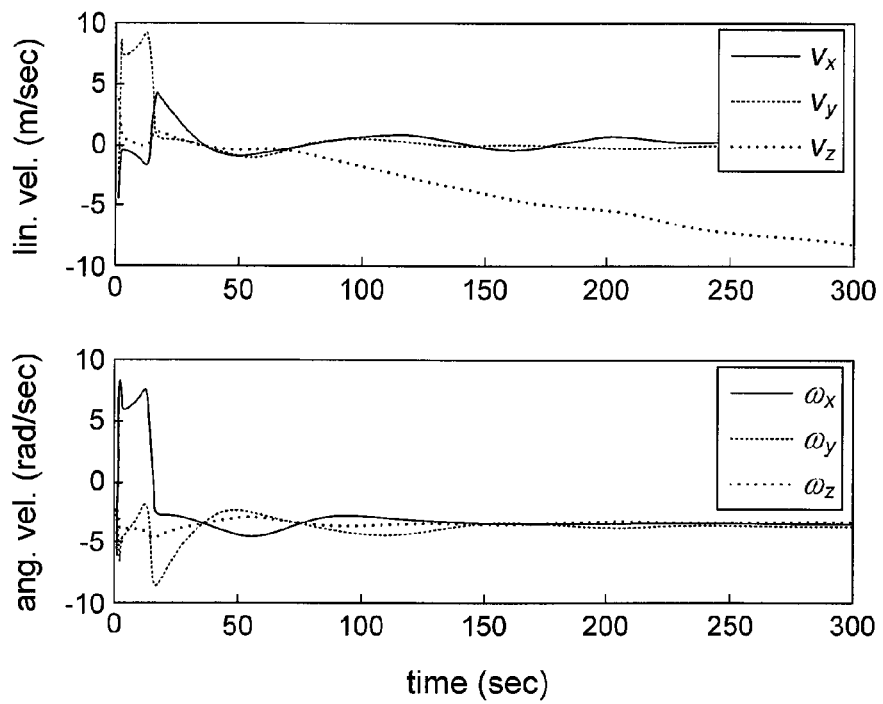
FIG. 5 comprises graphs that depict camera velocity over time for tracking randomly moving points with PID control.

Results using PID control for mean and variance regulation are presented are presented in FIGS. 3-5. FIG. 3 shows the trajectories of the viewed feature points in the image plane. FIG. 4 shows the error between the current and desired values of the task functions over time. The integral term caused some overshoot in both the mean and variance error regulation, but both task functions were regulated well in the presence of the uncertain disturbance. The perceptibility could not be driven to zero, due to the fact that it had a lower priority than the other tasks, but it was regulated to approximately 0.06. FIG. 5 shows the camera velocity over time, which remains smooth throughout the simulation.

2. Simulation 2: Two Randomly Moving Objects

In the second simulation, a camera observed two rigid, square objects. The objects moved independently of each other and the corners of the squares gave eight feature points to track. This simulation mimicked the case of an airborne camera tracking two vehicles. The mean was regulated to the image center. The variance was regulated to $[100^2, 100^2]^T$, i.e. a standard deviation of 100 pixels. The simulation was executed for 10 seconds at 30 frames per second. The square objects moved with sinusoidal velocities along all six degrees of freedom.

Figure 6:
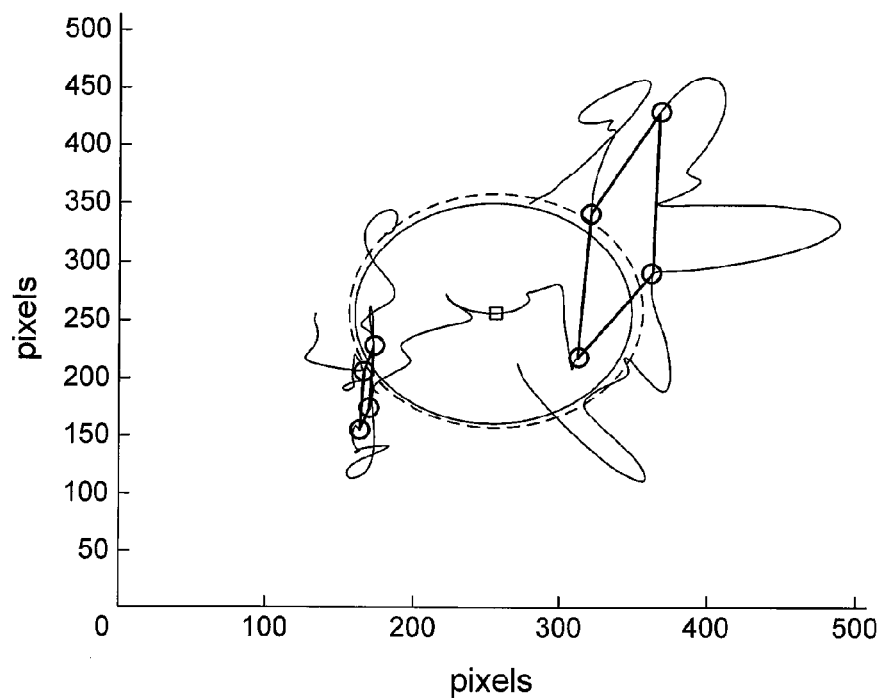
FIG. 6 is a graph that depicts feature point trajectories for tracking two objects with PID control.
Figure 7:
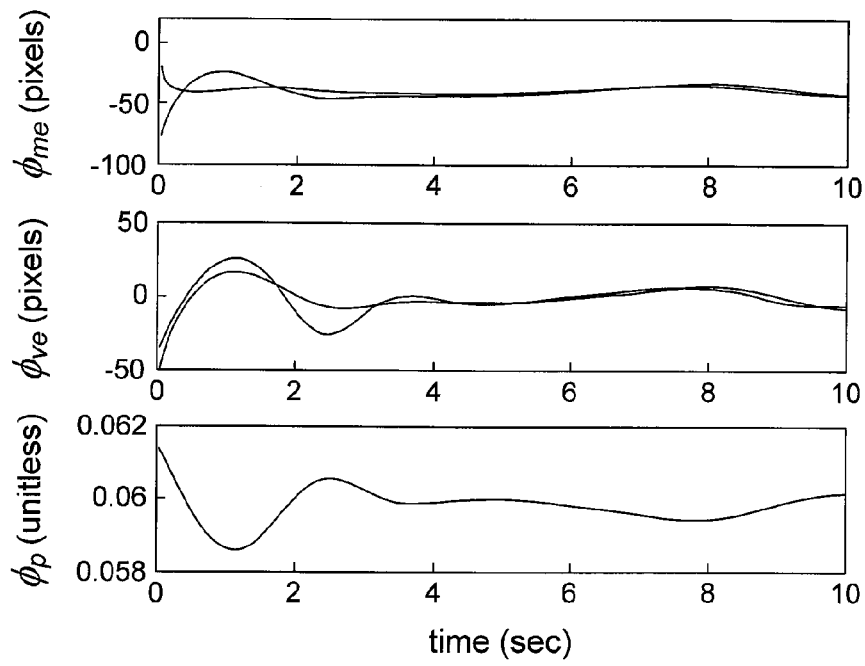
FIG. 7 comprises graphs that depict error in $\Phi_m$, $\Phi_v$, $\Phi_p$ over time for tracking two objects with PID control.
Figure 8:
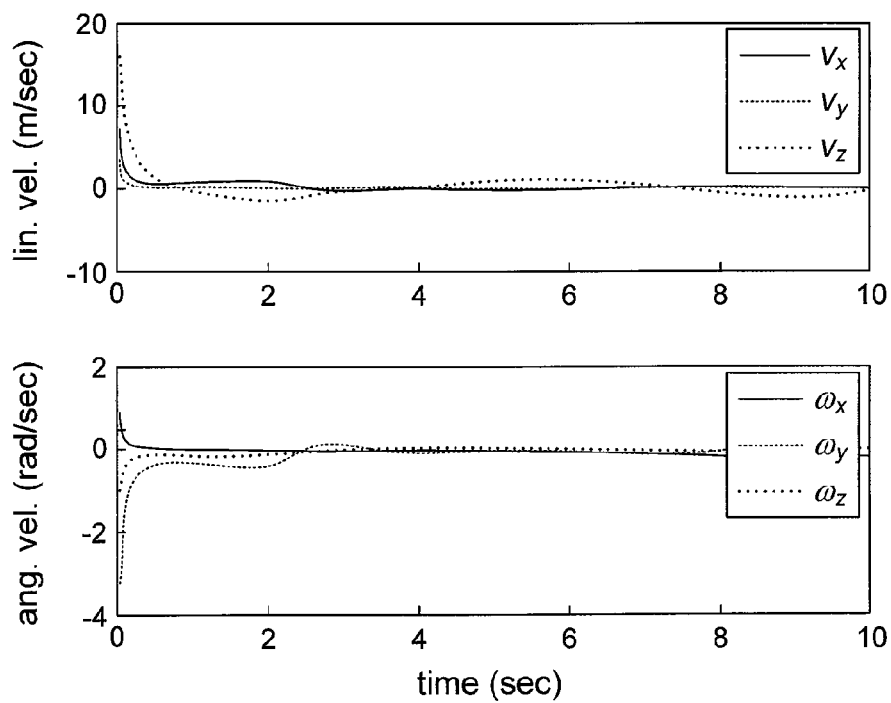
FIG. 8 comprises graphs that depict camera velocity over time for tracking two objects with PID control.

The results using the PID controller are shown in FIGS. 6-8. FIG. 6 depicts the trajectory of the viewed feature points in the image plane. The feature points all remained in the FOV. FIG. 7 illustrates the error between the current and desired mean and current and desired variance over time, and it can be seen that tracking error was regulated to about zero for both mean and variance. FIG. 8 shows the camera velocity over time.

Example System

Figure 9:
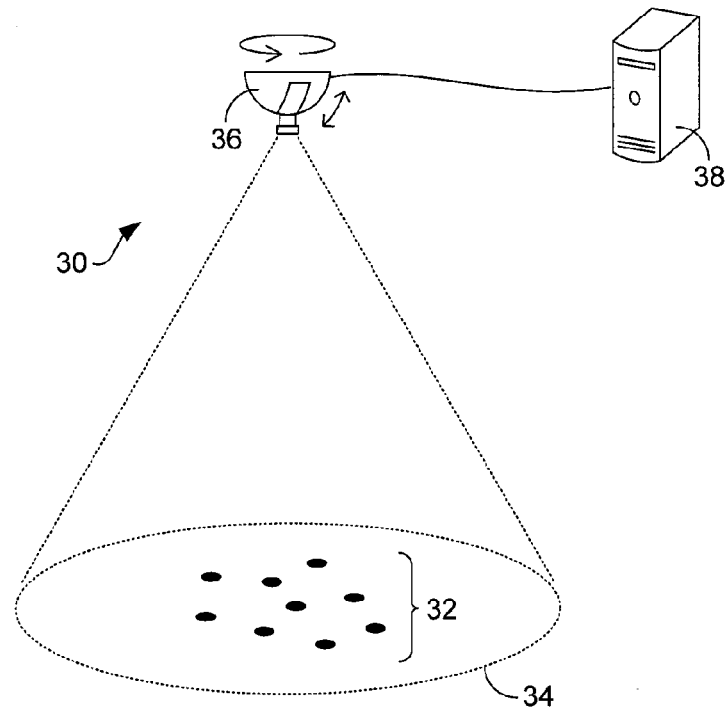
FIG. 9 is a schematic diagram of an example system that can be used to maintain multiple objects within a camera field of view.

FIG. 9 illustrates an example system 30 that can be used to track multiple moving objects 32 and maintain them within a camera FOV 34. As indicated in that figure, the system 30 generally comprises at least one camera 36 that is communicatively coupled (either with a wired or wireless connection) to a computing system 38. Although the computing system 38 is depicted in FIG. 9 as a conventional computer, the computing system can comprise other configurations. More important than the configuration of the computing system are its capabilities.

Figure 10:
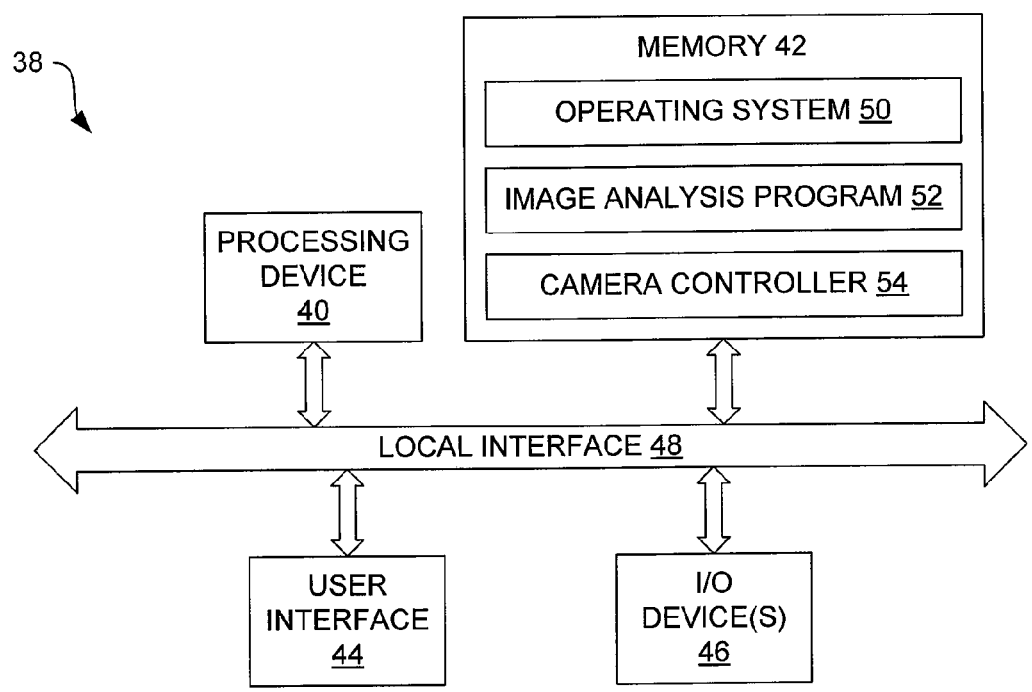
FIG. 10 is a block diagram that illustrates an example architecture for a computer system shown in FIG. 9.

FIG. 10 illustrates an example architecture for the computing system 38 shown in FIG. 9. As indicated in FIG. 10, the computing system 38 comprises a processing device 40, memory 42, a user interface 44, and at least one input/output (I/O) device 46, each of which is connected to a local interface 48.

The processing device 40 can comprise a central processing unit (CPU) that controls the overall operation of the computing system 38. The memory 42 includes any one of or a combination of volatile memory elements (e.g., RAM) and nonvolatile memory elements (e.g., hard disk, ROM, etc.) that store code that can be executed by the processing device 40.

The user interface 44 comprises the components with which a user interacts with the computing system 38, such as a keyboard, a mouse, and a computer monitor, or touch-screen monitor. The one or more I/O devices 46 are adapted to facilitate communications with other devices and may include one or more communication components such as a modulator/demodulator (e.g., modem), wireless (e.g., radio frequency (RF)) transceiver, network card, etc.

The memory 42 (i.e., a computer-readable medium) comprises various programs (i.e., logic) including an operating system 50 and an image analysis program 52. The operating system 50 controls the execution of other programs and provides scheduling, input-output control, file and data management, memory management, and communication control and related services. The image analysis program 52 is capable of identifying and tracking target objects within captured images and is configured to determine solutions to the imposed constraints and generate camera configuration information that identifies camera configurations in which objects can be maintained within the camera FOV, in accordance with the foregoing disclosure. The memory 42 further comprises a camera controller 54 that receives the camera configuration information and controls the camera to keep the objects within the FOV. In some embodiments, controlling the camera may include controlling a vehicle to which the camera is mounted to change the position or orientation of the camera.

Various code (i.e., logic) has been described in this disclosure. Such code can be stored on any computer-readable medium for use by or in connection with any computer-related system or method. In the context of this document, a "computer-readable medium" is an electronic, magnetic, optical, or other physical device or means that contains or stores code, such as a computer program, for use by or in connection with a computer-related system or method. The code can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The foregoing disclosure is provided for purposes of illustrating, explaining, and describing embodiments of the disclosed inventions. Modifications and adaptations to these embodiments will be apparent to those skilled in the art and may be made without departing from the scope or spirit of this invention. In one such modification, multiple cameras can be networked together so that objects that cannot be maintained within one camera's FOV can be "handed off" to one or more neighboring cameras so that the system can still track the objects. For example, once a first camera determines that an object is about to leave its FOV, the first camera can communicate the position, speed, and direction of travel of the object to a second camera to enable the second camera to add the object to the group of objects it is tracking and, therefore, maintaining within its FOV. With such a system, potentially no object can escape from view of the system.

We claim:

1. A method for controlling a camera to simultaneously maintain multiple objects within a field of view of the camera, the method comprising:

identifying a plurality of object tracking constraint functions to be enforced with respect to the multiple objects that are simultaneously maintained within the field of view, each of the plurality of object tracking constraint functions relating to an attribute of the multiple objects determined from image data captured by the camera, wherein one object tracking constraint function of the plurality of object tracking constraint functions relates to a location of a mean position of the multiple objects that are simultaneously maintained within the field of view;

identifying a priority ranking for the plurality of object tracking constraint functions such that more important object tracking constraint functions have a higher priority ranking than less important object tracking constraint functions, which have a lower priority ranking;

determining, by a computing system that includes a processing device, each attribute from the image data captured by the camera, including the mean position of the multiple objects; and determining, by the computing system, a set of solutions that satisfy the plurality of object tracking constraint functions relative to an order of their priority ranking such that solutions that satisfy lower priority ranking object tracking constraint functions are only considered viable if they also satisfy any higher priority ranking object tracking constraint functions, each solution of the set of solutions providing an indication as to how to control the camera to simultaneously maintain the multiple objects within the field of view of the camera.

2. The method of claim 1, further comprising regulating positioning of the camera based upon the set of solutions so that the mean position of the multiple objects is coincident with a center of the field of view of the camera.

3. The method of claim 1, wherein another object tracking constraint function of the plurality of object tracking constraint functions relates to a maximum variance from the mean position of the multiple objects that is permitted for any object of the multiple objects.

4. The method of claim 1, wherein another object tracking constraint function of the plurality of object tracking constraint functions relates to a perceptibility of motion of the multiple objects within the field of view of the camera.

5. The method of claim 1, wherein determining the set of solutions comprises developing an underdetermined task function for each of the plurality of object tracking constraint function.

6. The method of claim 5, wherein determining the set of solutions further comprises determining a derivative of the underdetermined task function for each of the plurality of object tracking constraint functions.

7. The method of claim 6, wherein determining the set of solutions further comprises developing a Jacobian matrix for the underdetermined task function for each of the plurality of object tracking constraint functions.

8. The method of claim 7, wherein determining the set of solutions further comprises determining null spaces for the Jacobian matrix for the underdetermined task function for each of the plurality of object tracking constraint functions, the null spaces comprising solutions that satisfy the plurality of object tracking constraint functions.

9. The method of claim 8, wherein determining the null spaces comprises identifying the null spaces of a Jacobian matrix associated with a lower priority object tracking constraint function that lie in the null space of a Jacobian matrix associated with a higher priority object tracking constraint function such that no solution for any of the plurality of object tracking constraint function is considered valid unless it is also valid for any preceding higher priority object tracking constraint function.

10. The method of claim 9, wherein the set of solutions is determined using an equation given by:

$$v_c = L^+(\dot{m}_m + (I - J_m^\dagger J_m)[\dot{m}_v + (I - J_v^\dagger J_v)\dot{m}_p]).$$

11. The method of claim 1, wherein each solution of the set of solutions indicates a camera configuration in which the multiple objects will be simultaneously maintained within the field of view of the camera.

12. The method of claim 11, wherein the camera configuration includes one or more of a camera setting, a camera pose, a camera position, or a camera velocity.

13. The method of claim 11, further comprising outputting one or more of the set of solutions as camera configuration information to a camera controller that controls the camera configuration.

14. A non-transitory computer-readable medium that stores instructions that can be executed by a processor for controlling a camera to simultaneously maintain multiple objects within a field of view of the camera, comprising:
    logic configured to identify a plurality of object tracking constraint functions to be enforced with respect to the multiple objects that are simultaneously maintained within the field of view, each of the plurality of object tracking constraint functions relating to an attribute of the multiple objects determined from image data captured by the camera, wherein one object tracking constraint function of the plurality of object tracking constraint functions relates to a location of a mean position of the multiple objects within the field of view;
    logic configured to identify a priority ranking for the plurality of object tracking constraint functions such that more important object tracking constraint functions have a higher priority ranking than less important object tracking constraint functions, which have a lower priority ranking;
    logic configured to determine each attribute from the image data captured by the camera, including the mean position of the multiple objects; and
    logic configured to determine a set of solutions that satisfy the plurality of object tracking constraint functions relative to an order of their priority ranking such that solutions that satisfy lower priority ranking object tracking constraint functions are only considered viable if they also satisfy any higher priority ranking object tracking constraint functions, each solution of the set of solutions providing an indication as to how to control the camera to simultaneously maintain the multiple objects within the field of view of the camera.

15. The medium of claim 14, further comprising logic configured to regulate positioning of the camera based upon the set of solutions so that the mean position of the multiple objects is coincident with a center of the field of view of the camera.

16. The medium of claim 14, wherein another object tracking constraint function of the plurality of object tracking constraint functions relates to a maximum variance from the mean position of the multiple objects that is permitted for any object of the multiple objects.

17. The medium of claim 14, wherein another object tracking constraint function of the plurality of object tracking constraint functions relates to a perceptibility of motion of the multiple objects within the field of view of the camera.

18. The medium of claim 14, wherein the logic configured to determine the set of solutions comprises logic configured to determine a derivative of an underdetermined task function related to each of the plurality of object tracking constraint functions.

19. The medium of claim 18, wherein the logic configured to determine the set of solutions further comprises logic configured to develop a Jacobian matrix for the underdetermined task function for each of the plurality of object tracking constraint functions.

20. The medium of claim 19, wherein the logic configured to determine the set of solutions further comprises logic configured to determine null spaces for the Jacobian matrix for the underdetermined task function for each of the plurality of object tracking constraint functions, the null spaces comprising solutions to each of the plurality of object tracking constraint functions.

21. The medium of claim 20, wherein the logic configured to determine the null spaces is configured to identify the null spaces of a Jacobian matrix associated with a lower priority object tracking constraint function that lie in the null space of a Jacobian matrix associated with a higher priority object tracking constraint function such that no solution for any of the plurality of object tracking constraint functions is considered valid unless it is also valid for any preceding higher priority object tracking constraint function.

22. The medium of claim 21, wherein the logic configured to determine the set of solutions is configured to determine the solutions using an equation given by:

$$v_c = L^+(\dot{m}_m + (I - J_m^\dagger J_m)[\dot{m}_v + (I - J_v^\dagger J_v)\dot{m}_p]).$$

23. The medium of claim 14, wherein each solution of the set of solutions indicates a camera configuration in which the multiple objects will be simultaneously maintained within the field of view of the camera.

24. The medium of claim 23, wherein the camera configuration includes one or more of a camera setting, a camera pose, a camera position, or a camera velocity.

25. A method for controlling a camera to simultaneously maintain multiple objects within a field of view of the camera, the method comprising:
    developing an underdetermined task function for each of multiple object tracking constraint functions to be enforced with respect to the multiple objects that are simultaneously maintained within the field of view, each of the multiple object tracking constraint functions relating to an attribute of the multiple objects determined from image data captured by the camera, a first object tracking constraint function of the multiple object tracking constraint functions relating to a location of a mean position of the multiple objects that are simultaneously maintained within the field of view and a second object tracking constraint function of the multiple object tracking constraint functions relating to a maximum variance from the mean position of the multiple objects that is permitted for any object of the multiple objects;
    determining each attribute from the image data captured by the camera;
    assigning a priority rank to each of the multiple object tracking constraint functions such that more important object tracking constraint functions have a higher priority rank than less important object tracking constraint functions, the first object tracking constraint function being assigned a higher priority rank than the second object tracking constraint function;
    developing a Jacobian matrix for each of the underdetermined task functions and therefore each of the multiple object tracking constraint functions;
    determining null spaces for each of the Jacobian matrices relative to an order of the priority ranks assigned to their associated object tracking constraint functions such that the null spaces for each of the associated object tracking constraint functions are within the null spaces of any of the multiple object tracking constraint functions having a higher priority rank, each of the null spaces identifying a camera configuration in which the multiple objects will be simultaneously maintained within the field of view; and
    outputting camera configuration information to a camera controller that controls the camera configuration, the camera configuration information simultaneously maintaining the multiple objects within the field of view of the camera.

26. The method of claim 25, further comprising regulating positioning of the camera based upon a set of solutions so that the mean position of the multiple objects is coincident with a center of the field of view of the camera.

27. The method of claim 25, wherein a third object tracking constraint function of the multiple object tracking constraint functions relates to a perceptibility of motion of the multiple objects within the field of view of the camera.

28. The method of claim 25, wherein the null spaces for each of the multiple object tracking constraint functions are determined using an equation given by:

$$v_c = L^+(\dot{m}_m + (I - J_m^\dagger J_m)[\dot{m}_v + (I - J_v^\dagger J_v)\dot{m}_p]).$$

* * * * *